United States Patent [19]

Wachi et al.

[11] Patent Number: 4,730,029

[45] Date of Patent: Mar. 8, 1988

[54] FLAME-RETARDANT RESIN

[75] Inventors: Hiroshi Wachi, Ebina; Tohru Kawasaki; Atsushi Funaki, both of Yokohama; Gen Kojima, Machida, all of Japan

[73] Assignee: Asahi Glass Company Ltd., Tokyo, Japan

[21] Appl. No.: 938,857

[22] Filed: Dec. 8, 1986

[30] Foreign Application Priority Data

Dec. 18, 1985 [JP] Japan .................. 60-282774
Jun. 27, 1986 [JP] Japan .................. 61-149688

[51] Int. Cl.$^4$ ............................. C08F 12/20
[52] U.S. Cl. ...................... 526/249; 526/253; 526/254; 526/255
[58] Field of Search ............... 526/249, 253, 254, 255

[56] References Cited

U.S. PATENT DOCUMENTS

| | | | |
|---|---|---|---|
| 3,767,634 | 10/1973 | Scoggins | 526/249 |
| 3,847,881 | 11/1974 | Mueller et al. | 526/253 |
| 4,020,253 | 4/1977 | Schulze | 526/231 |
| 4,184,001 | 1/1980 | Hildreth | 428/383 |
| 4,510,301 | 4/1985 | Levy | 526/249 |
| 4,513,129 | 4/1985 | Nakagawa et al. | 526/249 |
| 4,585,306 | 4/1986 | Ohmori et al. | 526/249 |

FOREIGN PATENT DOCUMENTS 59-167219 3/1983 Japan .

Primary Examiner—Joseph L. Schofer
Assistant Examiner—N. Sarofim
Attorney, Agent, or Firm—Oblon, Fisher, Spivak, McClelland & Maier

[57] ABSTRACT

A flame-retardant resin having excellent moldability composed essentially of a fluorine-containing copolymer obtained by the copolymerization of tetrafluoroethylene, chlorotrifluoroethylene and ethylene, wherein the copolymer comprises from 10 to 60 molar % of tetrafluoroethylene, from 20 to 60 molar % of chlorotrifluoroethylene and from 20 to 40 molar % of ethylene, and has a thermal decomposition temperature of at least 325° C.

13 Claims, No Drawings

FLAME-RETARDANT RESIN

BACKGROUND OF THE INVENTION

1. Field of the Invention

The present invention relates to a flame-retardant resin having excellent moldability. More particularly, it relates to such a flame-retardant resin composed essentially of a specific fluorine-containing copolymer obtained by the copolymerizatin of tetrafluoroethylene, chlorotrifluoroethylene and ethylene.

2. Description of the Background

In recent years, attention has been drawn to flame-retardant resins having a high oxygen index, low fuming property and low dripping property as coating materials for plenum cables or as fire proofing materials. As one of the resins having such properties, a fluorine-containing copolymer of chlorotrifluoroethylene (hereinafter referred to simply as CTFE) with ethylene (hereinafter referred to simply as ET) is known. For example, some CTFE/ET type copolymers are disclosed in U.S. Pat. Nos. 3,847,881 and 3,767,634, West German Patent Publication No. 2,613,691 and Japanese Examined Patent Publication No. 32786/1974.

However, conventional CTFE/ET type copolymers usually have a relatively low thermal decomposition temperature at a level of about 320° C. Fluorine-containing copolymers having a relatively high thermal decomposition temperature, tend to have a high melting point at a level of at least 250° C. In any case, they have a drawback that the moldable temperature range is narrow. The above-mentioned publications also disclose copolymers of tetrafluoroethylene (hereinafter referred to simply as TFE) with ET and CTFE/TFE/ET type copolymers. However, these copolymers have drawbacks such that the oxygen index is small, or dripping takes place at the time of combustion, thus the flame retardancy is not necessarily satisfactory.

SUMMARY OF THE INVENTION

It is an object of the present invention to solve the above-mentioned drawbacks inherent to the conventional techniques, and to provide a flame-retardant resin having a high thermal decomposition temperature, a wide moldable temperature range and excellent moldability.

The present inventors have conducted extensive research and studies on fluorine-containing copolymers expected to have high thermal decomposition temperatures with the aim of solving the above-mentioned problems, and as a result, found the following interesting fact. Namely, it is possible to obtain a fluorine-containing copolymer having a high thermal decomposition temperature and excellent moldability by copolymerizing a combination of three components of CTFE, TFE and ET, and that excellent flame retardancy can be attained while maintaining the excellent moldability by adjusting the compositional proportions of the above-mentioned three components in certain specific ranges.

The present invention has been accomplished on the basis of the above discoveries, and provides a flame-retardant resin having excellent moldability composed essentially of a fluorine-containing copolymer obtained by the copolymerization of TFE, CTFE and ET, wherein the copolymer comprises from 10 to 60 molar % of TFE, from 20 to 60 molar % of CTFE and from 20 to 40 molar % of Et, and has a thermal decomposition temperature of at least 325° C.

DETAILED DESCRIPTION OF THE PREFERRED EMBODIMENTS

Now, the present invention will be described in detail with reference to the preferred embodiment.

In the present invention, it is important that the fluorine-containing copolymer is obtained by the copolymerization of the three components of TFE, CTFE and ET in the specific compositional proportions. Firstly, the proportion of ET is from 20 to 40 molar %, preferably from 25 to 35 molar %. If the amount of ET is too much, the oxygen index decreases, whereby it becomes difficult to obtain excellent flame retardancy. On the other hand, if the amount is too small, the melt viscosity tends to be high to a level of the melt viscosity of polytetrafluoroethylene or polychlorotrifluoroethylene, whereby the moldability will be poor. Secondly, the proportion of CTFE is from 20 to 60 molar %, preferably from 20 to 55 molar %. If the amount of CTFE is too small, dripping is likely to take place at the time of combustion, and if the amount is too much, the moldability tends to be poor. Finally, the proportion of TFE is from 10 to 60 molar %, preferably from 15 to 55 molar %. If the amount of TFE is too small, the difference between the melting point and the thermal decomposition temperature tends to be small, whereby the moldability will be poor. On the other hand, if the amount is too much, the melt viscosity tends to be high, whereby the moldability will be poor.

The above-mentioned specific fluorine-containing copolymer of the present invention has excellent moldability and excellent flame retardancy. Namely, the oxygen index is at least 60, e.g. as high as from 76 to 80, and at the time of combustion, it is carbonized and thus has good dripping resistance. Further, the difference between the melting point and the decomposition temperature is at least 120° C., e.g. as large as from 140° to 185° C., and thus it has excellent moldability. Furthermore, the specific fluorine-containing copolymer of the present invention has a high thermal decomposition temperature, and it usually has a thermal decomposition temperature of at least 325° C., and in a preferred embodiment, the thermal decomposition temperature can be made as high as from 340° to 370° C. The melting point may vary, like the above thermal decomposition temperature, depending upon the molecular weight which will be described hereinafter. However, the melting point is usually from 170° to 230° C., preferably from 180° to 220° C. In the present invention, the molecular weight of the specific fluorine-containing copolymer is usually from 5 to 200 mm$^3$/sec., preferably from 10 to 150 mm$^3$/sec. as the volumetric flow rate which will be defined hereinafter, in order to provide adequate mechanical strength as a coating material for electric wires or as a fire proofing material and to provide excellent moldability.

The term "volumetric flow rate" used in this specification is defined as follows, and gives an index for the molecular weight. Namely, by using a Koka-type flow tester, 1 g of a sample was extruded from a nozzle having a nozzle diameter of 1 mm and a land length of 2 mm at a predetermined temperature and a predetermined load of 30 kg/cm$^2$, and the volume of the molten sample extruded during a unit time is defined to be the "volumetric flow rate", and the unit of the volumetric flow rate is mm$^3$/sec. Here, the predetermined temperature is selected within the temperature range within which the specific fluorine-containing copolymer is moldable (i.e. the temperature range between the melting point and the thermal decomposition temperature). Thus, with respect to the specific fluorine-containing copolymer in the present invention, 300° C. is selected as the predetermined temperature.

For the production of the fluorine-containing copolymer of the present invention, any polymerization method known or well-known for the copolymerization of TFE or CTFE, may be employed without any particular restriction. For example, any one of solution polymerization, suspension polymerization and emulsion polymerization may be employed. The polymerization initiator to be used for the solution polymerization, included, for example, di-(chlorofluoroacyl)-peroxide, di-(perfluoroacyl)-peroxide, di-(ω-hydroperfluoroacyl)-peroxide, t-butyl peroxyisobutyrate and diisopropyl peroxydicarbonate.

Further, the solvent may be a chlorofluoroalkane. The chlorofluoroalkane includes, for example, trichlorofluoromethane, dichlorodifluoromethane, dichlorofluoromethane, chlorodifluoromethane, trifluoromethane, trichlorotrifluoroethane, dichlorotetrafluoroethane, chloropentafluoroethane and difluoroethane. Further, if necessary, a chain transfer agent may be added to control the molecular weight. For example, it is preferred to employ a chain transfer agent such as carbon tetrachloride, n-pentane, n-hexane, isopentane, trichlorofluoromethane or methanol.

In the suspension polymerization, the same initiators as mentioned in the above solution polymerization may be employed as the initiator for the radical polymerization. As the solvent, there are may be employed a mixture of water with a chlorofluoroalkane as mentioned in the above solution polymerization, whereby the mixing ratio of water:chlorofluoroalkane is usually from 1:9 to 9:1, preferably from 1:5 to 5:1 by weight. As the chain transfer agent, it is preferred to use those mentioned in the above-solution polymerization. Further, a fluorocarbon-type emulsifier such as $C_7F_{15}COONH_4$ or $C_8F_{17}COONH_4$, may be added as a suspension stabilizer. As the radical polymerization initiator to be used in the emulsion polymerization, there are may be employed usual water-soluble radical polymerization initiators. For instance, disuccinic acid peroxide, ammonium persulfate, potassium persulfate, t-butylperoxyisobutyrate and 2,2'-diguanyl-2,2'-azopropane dihydrochloride, may be mentioned. As a solvent, water alone or a solvent mixture of water with an organic solvent, may be employed. As the organic solvent, t-butanol, difluoroethane or trichlorotrifluoroethane may be used. As a chain transfer agent, those mentioned for the solution polymerization may be employed. As the emulsifier, it is preferred to employ a fluorocarbon-type emulsifier such as $C_7F_{15}COONH_4$ or $C_8F_{17}COONH_4$.

The polymerization conditions in the above-mentioned various polymerization methods may be selected from wide ranges without any particular restriction. Specific manner and conditions for polymerizations will be described in Examples given hereinafter.

The fluorine-containing copolymer for the present invention has a wide moldable temperature range and can be used widely for molding various shaped parts, pipes or containers. In particular, by virtue of its excellent flame retardancy, it is suitably employed as a coating material for electric wires, electrical parts, building material parts or parts for automobiles or aircrafts, and it is also applicable to fibers or film sheets.

Now, the present invention will be described in further detail with reference to Examples and Comparative Examples. However, it should be understood that the present invention is by no means restricted by such specific Examples.

The melting point, the thermal decomposition temperature, the copolymer composition, the oxygen index and the dripping property at the time of combustion, were measured by the following methods.

MELTING POINT AND THERMAL DECOMPOSITION TEMPERATURE

By using DT-3D model manufactured by Shimadzu Corporation, the temperature was raised from room temperature at a rate of 10° C./min., whereby the maximum point of the melting curve was taken as the melting point, and the starting point for decrease of the thermogravimetric curve was taken as the thermal decomposition temperature.

COPOLYMER COMPOSITION

The composition of each copolymer was calculated from the fluorine content and the chlorine content of the copolymer. The fluorine content and the chlorine content were measured by the following methods, respectively. Namely, the fluorine content was determined by trapping the fluorine generated by the thermal decomposition of the copolymer, in an aqueous solution and measuring it by a fluoride ion selective electrode (No. 476042 manufactured by Corning Company, U.S.A.). The chlorine content was determined by molding the copolymer into a sheet and measuring the chlorine content by a fluorescent X-ray analyser (IKF3064M model manufactured by Rigaku Denki KK).

OXYGEN INDEX

In accordance with the method of JIS K7201-1972, the oxygen index was measured by means of Candle method combustion tester number 606 manufactured by Toyo Seiki KK.

DRIPPING PROPERTY AT THE TIME OF COMBUSTION

A sheet sample having a thickness of 0.5 mm was placed on a metal net. The sample was burnt by a bunsen burner using propane gas with a flame directed obliquely from above, whereupon the dripping property was evaluated by examining whether or not a charcoal remained on the metal net.

EXAMPLE 1

Into an evacuated 1200 ml stainless steel autoclave, 626 g of trichlorotrifluoroethane and 561 g of trichlorofluoromethane were added under stirring, and then 64.6 g of chlorotrifluoroethylene, 2.6 g of ethylene and 120.6 g of tetrafluoroethylene were added thereto. The temperature of the autoclave was raised to 65° C. under stirring, and a 5 ml of a solution obtained by dissolving t-butyl peroxyisobutyrate in trichlorotrifluoroethane in an amount of 41.6 g/l, was added thereto. The pressure at this point was 12 kg/cm². As the polymerization started, a gas mixture comprising 50 molar % of tetrafluoroethylene, 20 molar % of chlorotrifluoroethylene and 30 molar % of ethylene, was continuously supplied to maintain the pressure at a constant level.

After conducting the polymerization for 3 hours, the product was recovered and dried at 150° C. for 9 hours to obtain 51 g of a polymer. The composition of this polymer was TFE/CTFE/ET=45/24/31 (molar %) as measured by the above-mentioned measuring method. Further, various properties such as the melting point, the thermal decomposition temperature, etc. were measured, and the results are shown in Table 1.

EXAMPLE 2

The operation was conducted in the same manner as in Example 1 except that the weights of the monomers initially charged were changed to 103.8 g of chlorotrifluoroethylene, 2.1 g of ethylene and 89.1 g of tetrafluoroethylene, and the composition of the additional gas mixture was changed to 35 molar % of tetrafluoroethylene, 35 molar % of chlorotrifluoroethylene and 30 molar % of ethylene. The polymerization was conducted for 3.5 hours, whereby 35 g of a polymer was obtained. The composition of this polymer was TFE/CTFE/ET=33/36/31 (molar %). The properties thereof as shown in Table 1.

EXAMPLES 3 TO 7

In the same manner as in Example 1, polymers having different compositions were prepared by selecting the composition of the monomer mixture initially charged and the composition of the monomer mixture additionally supplied, as shown below.

| Example | Initially charged monomer composition (molar %) TFE/CTFE/ET | Additionally supplied monomer composition (molar %) TFE/CTFE/ET | Polymer composition (molar %) TFE/CTFE/ET |
| --- | --- | --- | --- |
| 3 | 30/64/6 | 20/45/35 | 19/43/38 |
| 4 | 26/70/4 | 20/55/25 | 20/54/26 |
| 5 | 70/27/3 | 60/20/20 | 58/22/20 |
| 6 | 17/75/8 | 10/55/35 | 12/55/33 |
| 7 | 45/45/10 | 30/30/40 | 32/31/37 |

The properties of the polymers are shown in Table 1.

COMPARATIVE EXAMPLES 1 TO 3

In the same manner as in Example 1, polymers having different compositions, i.e. TFE/ET=70/30 (molar %) in Comparative Example 1, TFE/CTFE/ET=20/31/49 (molar %) in Comparative Example 2 and TFE/CTFE/ET=9/47/45 (molar %) in Comparative Example 3, were obtained by changing the composition of the monomer mixture initially charged and the composition of the monomer mixture additionally supplied. The properties of the respective polymers are shown in Table 1.

Thus, the present invention provides a flame-retardant resin having excellent effects such as excellent moldability with the difference between the melting point and the thermal decomposition temperature being at least 120° C., and excellent fire-retardancy with improved dripping resistance such that it is carbonized at the time of combustion. Further, the fluorine-containing copolymer of the present invention has excellent electrical properties, and when used as a coating material for electric wires, it provides useful effects as flame-retardant low fuming electric wires.

TABLE 1

| | Polymer composition (*1) | Melting point (°C.) | Decomposition temperature (°C.) | (*2) T | (*3) O.I. | Carbonization upon combustion |
| --- | --- | --- | --- | --- | --- | --- |
| Example 1 | 45/24/31 | 201 | 367 | 166 | 76 | Yes |
| Example 2 | 33/36/31 | 172 | 357 | 185 | 80 | Yes |
| Example 3 | 19/43/38 | 191 | 349 | 158 | 66 | Yes |
| Example 4 | 20/54/26 | 208 | 353 | 145 | 87 | Yes |
| Example 5 | 58/22/20 | 221 | 365 | 144 | 83 | Yes |
| Example 6 | 12/55/33 | 203 | 329 | 126 | 70 | Yes |
| Example 7 | 32/31/37 | 197 | 338 | 141 | 63 | Yes |
| Comparative Example 1 | 70/0/30 | 248 | 369 | 121 | 61 | No |
| Comparative Example 2 | 20/31/49 | 232 | 313 | 81 | 45 | Yes |
| Comparative Example 3 | 9/47/45 | 210 | 316 | 106 | 53 | Yes |

(*1) Tetrafluoroethylene/Chlorotrifluoroetylene/Ethylene (molar %)
(*2) Decomposition temperature (°C.) — Melting point (°C.)
(*3) Oxygen index (%)

We claim:
1. A flame-retardant resin having excellent moldability and composed of a fluorine-containing polymer obtained by the copolymerization of tetrafluoroethylene, chlorotrifluoroethylene and ethylene, wherein the polymer consists essentially of from 10 to 16 molar % tetrafluoroethylene, from 20 to 60 molar % chlorotrifluoroethylene, and from 20 to 40 molar % ethylene, and has a thermal decomposition temperature of at least 325° C.

2. The flame-retardant resin of claim 1, wherein the difference between the melting point and the thermal decomposition temperature of the fluorine-containing copolymer is at least 120° C.

3. The flame-retardant resin of claim 1, wherein the fluorine-containing copolymer has an oxygen index of at least 60.

4. The flame-retardant resin of claim 1, wherein the fluorine-containing copolymer is carbonizable upon combustion.

5. The flame-retardant resin of claim 1, wherein the fluorine-containing copolymer has good dripping resistance.

6. The flame-retardant resin of claim 1, wherein the polymer comprises from 15 to 55 molar % tetrafluoroethylene, from 20 to 55 molar % chlorotrifluoroethylene, and from 25 to 35 molar % ethylene.

7. The flame-retardant resin of claim 1, wherein the fluorine-containing polymer has an oxygen index of from 76 to 80.

8. The flame-retardant resin of claim 1, wherein the difference between the melting point and the thermal decomposition temperature of the fluorine-containing polymer is from 140° to 185° C.

9. The flame-retardant resin of claim 1, wherein the copolymer has a thermal decomposition temperature of at least 340° C.

10. The flame-retardant resin of claim 1, wherein the fluorine-containing polymer has a melting point of from 170° to 230° C.

11. The flame-retardant resin of claim 1, wherein the fluorine-containing copolymer has a melting point of from 180° to 220° C.

12. The flame-retardant resin of claim 1, wherein the fluorine-containing copolymer has a molecular weight, measured as a volummetric flow rate, or from 5 to 200 $mm^3 sec^{-1}$.

13. The flame-retardant resin of claim 1, wherein the fluorine-containing copolymer has a molecular weight, measured as a volummetric flow rate, of from 10 to 150 $mm^3 sec^{-1}$.

* * * * *